United States Patent [19]

Seitz

[11] 4,082,439

[45] Apr. 4, 1978

[54] FILM DUPLICATOR

[75] Inventor: Paul N. Seitz, Zurich, Switzerland

[73] Assignee: Quantor Corporation, Mountain View, Calif.

[21] Appl. No.: 659,830

[22] Filed: Feb. 20, 1976

Related U.S. Application Data

[62] Division of Ser. No. 501,590, Aug. 29, 1974, Pat. No. 3,958,142.

[51] Int. Cl.² .............................................. G03B 27/30
[52] U.S. Cl. ....................................... 355/100; 355/67
[58] Field of Search ................... 355/91, 99, 100, 102, 355/30, 67; 313/22, 201

[56] References Cited

U.S. PATENT DOCUMENTS

| 1,790,086 | 1/1931 | Boerstler | 313/22 |
|---|---|---|---|
| 3,337,763 | 8/1967 | Aronson et al. | 313/22 |
| 3,621,458 | 11/1971 | Cabezas et al. | 313/198 X |
| 3,740,139 | 6/1973 | Limberger | 355/100 |
| 3,740,140 | 6/1973 | Wolf et al. | 355/91 |
| 3,741,650 | 6/1973 | Leavitt et al. | 355/91 |
| 3,749,490 | 7/1973 | Ritzerfeld | 355/100 X |
| 3,817,618 | 6/1974 | Riley et al. | 355/100 |
| 3,836,252 | 9/1974 | Touchette et al. | 355/100 |

*Primary Examiner*—Fred L. Braun
*Attorney, Agent, or Firm*—Townsend and Townsend

[57] ABSTRACT

A duplicator for making copies of a microfiche master. The master is positioned at a transfer station and a copy film is stored on a supply roll and incrementally advanced to the transfer station by a film drive disposed upstream of the transfer station so that fresh copy film is pushed downstream into registration with the master. Pressurized air supply conduits are disposed between the film drive and the transfer station and are activated so that the copy film moves downstream on an air cushion to minimize copy film drag and sticking. A film cutter is disposed immediately downstream of the transfer station in substantial registration with a downstream edge of the master to eliminate copy film waste. Exposed copy film is transported past a developing station and a curing station to a copy film discharge station. A first light source at the transfer station exposes the copy film and comprises an elongate, pulsed gas discharge lamp, such as a Xenon lamp which is surrounded by a coaxial, light transmissive flow tube having spaced apart intake and outlet conduits which are serially connected to a fluid circuit in which an electrically conductive, infrared absorbing liquid flows. A second light source is disposed at the curing station for curing the developed images on the copy film. Electric circuitry employs a single power source for alternatingly pulsing the two light sources.

11 Claims, 4 Drawing Figures

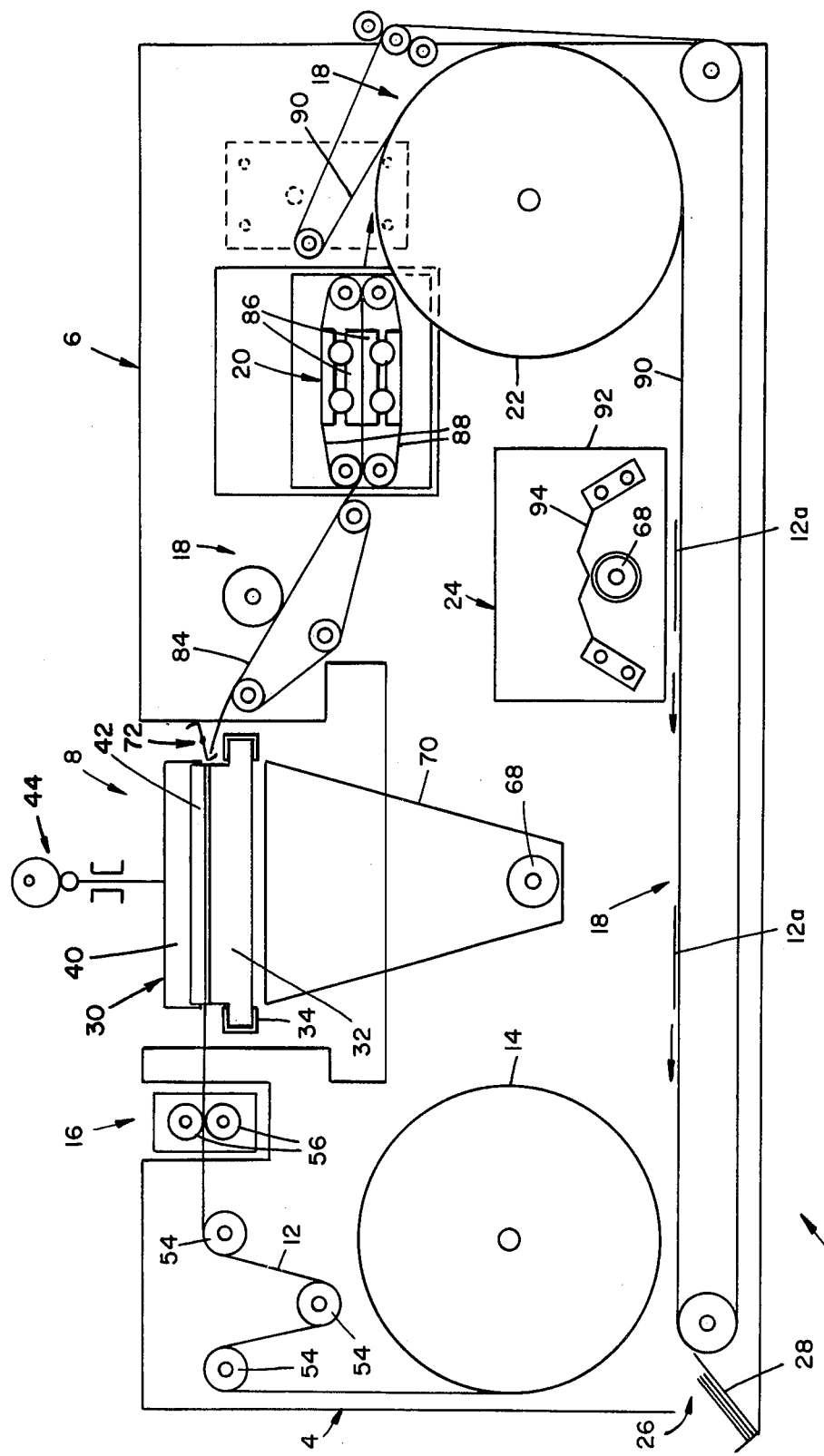
FIG_1

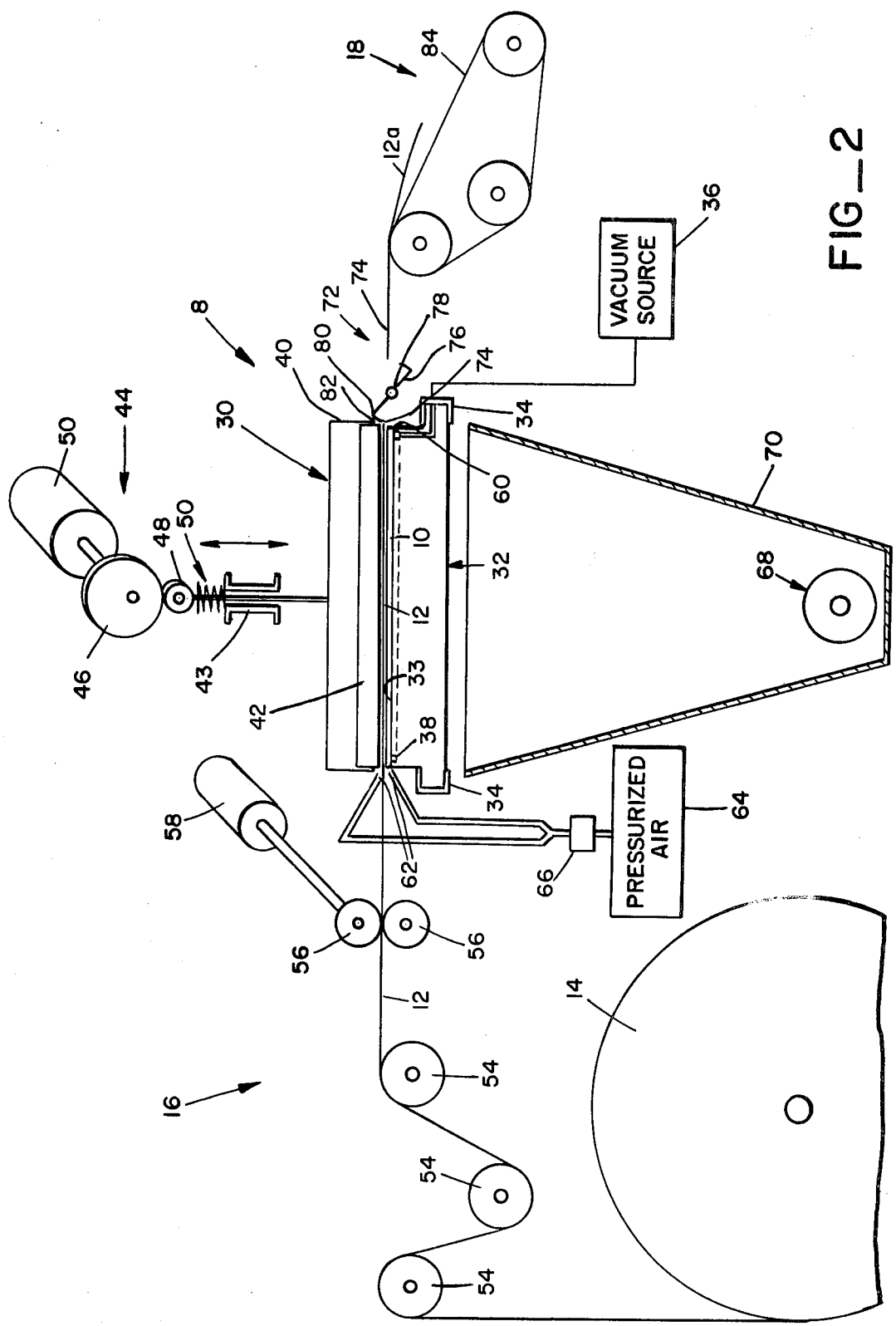

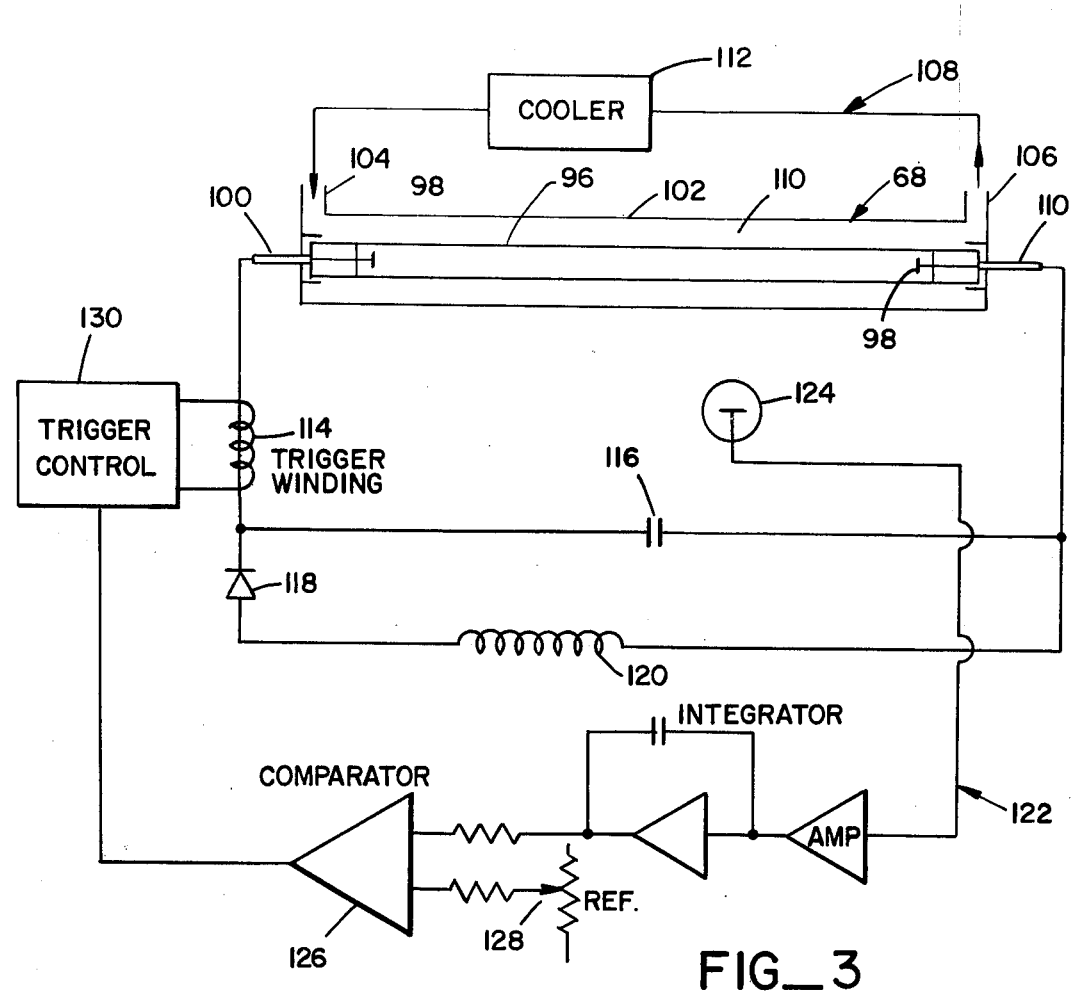
FIG_3
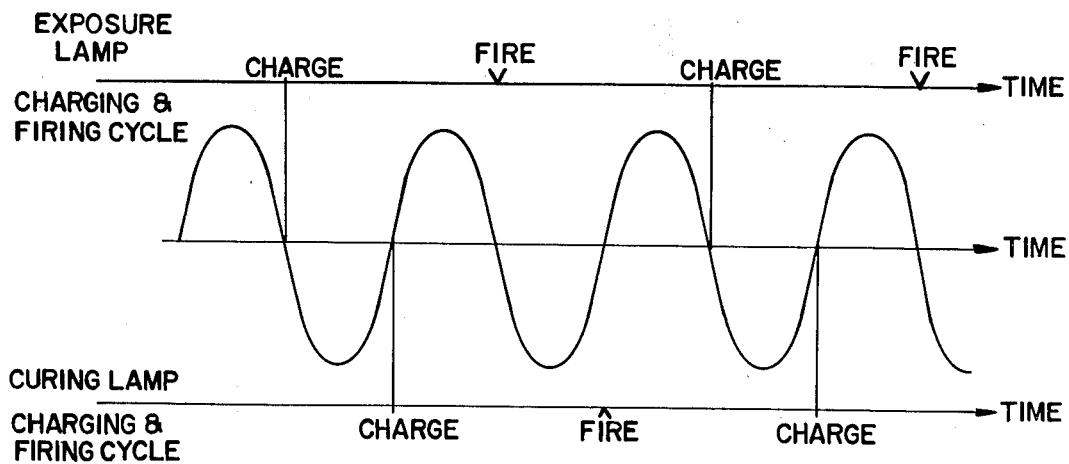
FIG_4

FILM DUPLICATOR

This is a division, of application Ser. No. 501,590, filed Aug. 29, 1974.

BACKGROUND OF THE INVENTION

The present invention relates to film duplicators and particularly to duplicators for making one or more copies or a microfiche master.

The prior art discloses a variety of film and microfiche duplicators. Generally speaking, such duplicators provide that the master be positioned at a transfer station and that copy film be incrementally advanced past the transfer station for "contact printing". As used herein "contact printing" means that the copy film is brought into intimate contact with the master by biasing the two against each other and to thereafter direct light past the master onto the copy film to reproduce the master images on the copy film. After each copy is made the copy film is incrementally advanced. Exposed copy film sections are taken up on an exposed film reel. After the desired number of copies has been made the exposed copy film is developed and severed into individual copy film sections each of which is a duplicate of the master at the transfer station.

A drawback of such duplicators is the fact that the copies are only available after the exposed film roll is developed and fixed. This may involve substantial time delays which in many applications are undesirable or unacceptable.

To overcome this problem it has been suggested to sever each film section as soon as it has been exposed. This is normally accomplished by grasping an end of the copy film and advancing it after completion of a contact printing step. This approach involves a waste of expensive film and is therefore economically unattractive since an unused length of copy film at the free end of the film is necessary to enable the grasping of the film. To accommodate the necessary high film advancing speeds, this approach was nevertheless generally adhered to.

The small image size on microfiche and the required high image resolution makes it further necessary that light sources which provide a high light density be used. In the past, the desired light intensities were obtained from metal halite lamps. Such lamps provide the desired light intensity but must be turned on as much as one half-hour before they reach their peak intensity. Furthermore, they must remain turned on as long as copies are made, or might be made, since they require the long warm-up period each time they are turned off. This wastes substantial amounts of energy and is relatively expensive. Moreover, the lamps create large amounts of heat. They therefore require complicated cooling devices, fans, and the like, to keep the duplicator within an acceptable operating temperature range.

SUMMARY OF THE INVENTION

The present invention provides a microfiche duplicator with which any number of copies can be made, each copy being available as soon as it has been exposed, developed and cured or fixed. Thus, it involves no waiting time. Furthermore, the copy film advancing mechanism pushes the copy film into registration with the master-fiche. This not only allows the severance of each exposed copy immediately after the contact printing step, but eliminates the heretofore necessary wasted film length for grasping the free end of the film and advancing it. Thus, substantial cost savings are obtained. Additionally, the present invention provides a high intensity light source for exposing the copy film which uses relatively little energy, which has a relatively low heat output and which has a substantially longer service life than prior art lamps.

Generally speaking, the present invention contemplates the use of a microfilm duplicating apparatus which has means for holding a master at a transfer station, means for storing a supply of copy film having a length substantially greater than the length of the master, and means disposed between the storing means and the transfer station for incrementally advancing to the transfer station a length of copy film equal to the length of the master. Upon actuation of the advancing means, therefore, copy film is pushed in a downstream direction to the transfer station. To enable high film advancing speeds pressurized gas, such as air, is blown against both sides of the film to separate it from contact with other objects, such as the master and hold-down platen, and provide low friction air bearing.

Cutoff means, such as a rotary cutter with a cooperating shear edge, which is preferably defined by a holddown platen for the film at the transfer station, is provided immediately downstream of that station and defines a shear line substantially co-extensive with a downstream edge of the master for severing each exposed length of copy film immediately after it has been exposed and without any copy film waste.

The transfer station includes a high intensity gas discharge lamp, such as a Xenon lamp which has spaced apart electrodes enveloped in an elongate, light transmissive lamp body. A light transmissive flow tube is coaxially disposed about the lamp and has first and second fluid conduits disposed adjacent ends of the body for communicating an interior space between the body and the tube with the exterior. An electrically conductive liquid, such as cupric sulfate ($CuSO_4$), which is also capable of absorbing infrared radiation, is continuously flowed through the first conduit into the space between the lamp and the flow tube and into direct contact with an exterior surface of the lamp to form an exterior electrically conductive medium surrounding the lamp body. The liquid enables the triggering of the lamp and its pulsed operation. At the same time it absorbs infrared radiation to continuously cool the lamp and prevent excessive heat from reaching the master and the copy film at the transfer station.

It is preferred that a second such Xenon lamp be mounted at an exposed copy film curing station to fix the contact printed images thereon. The electric circuit means for the lamps includes means for activating both lamps and for alternatingly subjecting the lamps to voltage pulses. In this manner the circuit means can be driven by a single electrical power supply which is subjected to a relatively constant load.

To adjust the intensity, darkness, etc. of the exposed copy film means is further operatively coupled with the film advancing means and with the electric circuit means for energizing the lamp at the transfer station only after fresh, unexposed copy film has been advanced. The adjustment means varies the number of voltage pulses to which the first lamp is subjected after the fresh copy film has been positioned at the transfer station to correspondingly control the number of light pulses generated by the lamp and to thereby adjust the darkness and intensity of the transferred image on the copy film.

The microfiche duplicator of the present invention is a substantial improvement over the prior art. As already alluded to, copy film waste is eliminated without compromising operating speed (even though film is pushed rather than pulled since the pushed portion of the copy film floats on an air bearing while it is in motion) while the copy becomes available as soon as it is exposed, developed and cured. Furthermore, the high intensity pulsed gas discharge lamp is of substantially greater efficiency than prior art gas discharged lamps because the heretofore necessary exterior trigger wire surrounding the lamp is eliminated by flowing the electrically conductive liquid through the exterior flow tube. This liquid, particularly when it comprises cupric sulfate also absorbs infrared radiation to both cool the lamp and shield the film at the transfer station from potentially damaging infrared radiation. Thus, this construction of the lamp eliminates the heretofore necessary intricate, expensive and fail prone cooling fans and devices, optical filters, etc.

BRIEF DESCRIPTION OF THE DRAWINGS

FIG. 1 is a schematic, side elevational view of the microfiche duplicator constructed in accordance with the present invention;

FIG. 2 is a schematic, fragmentary and enlarged side elevational view of the transfer station employed in the duplicator illustrated in FIG. 1;

FIG. 3 is a schematic illustration of the pulsed gas discharge lamp and the supporting electric circuitry of the present invention; and FIG. 4 is a diagram illustrating the operation of the exposure and film curing lamps.

DESCRIPTION OF THE PREFERRED EMBODIMENTS

Referring first to FIG. 1, a microfiche duplicator 2 constructed in accordance with the invention generally comprises a frame 4 disposed within a housing 6 and mounting a transfer or printing station 8 where images from a master fiche 10 are transferred onto copy film 12 by contact printing. A length of copy film is stored on a supply reel 14 positioned upstream from the transfer station. Copy film is incrementally advanced through the transfer station copy film drive mechanism 16 disposed between the supply reel and the transfer station.

Also disposed within housing 6 and suitably mounted to frame 4 is a conveyor belt system 18 which transports exposed copy film (which has been severed from the copy film strip after its exposure as is more fully discussed hereinafter) from the transfer station through a film developer 20, around a cooling drum 22, through a film curing or fixing station 24 and hence past an exposed, developed and fixed copy film discharge station 26 into a suitable receptacle 28.

Referring now to FIGS. 1 and 2, transfer station 8 comprises a pair of cooperating upper and lower platens 30, 32, respectively, between which the master fiche and the copy film are biased into intimate engagement during contact printing. The lower platen comprises a transparent glass plate which is horizontally slidable on linear tracks 34 into an out of registration with the upper platen 30. The master fiche 10 is placed flat against an upper side 33 of glass platen 32 and immovably retained thereon by a vacuum supplied by a vacuum source 36 to a peripheral vacuum groove 38 in the glass platen. In use the glass platen is pulled out from registration with the upper platen 30 for replacement of the master fiche after the vacuum in groove 38 has been released. When the new fiche has been placed onto the glass platen and the vacuum has been reapplied the glass platen is slidably moved back into registration with the upper platen.

The upper platen preferably comprises a metal plate 40 which has the same size as the upper surface 33 of the glass platen which has a rectangular recess of a slightly lesser outline. A resiliently compressible member such as a rubber pad 42 is pressed or bonded into the recess and protrudes therefrom. The upper platen is mounted in suitable bearings 43 (schematically illustrated in FIG. 2) for limited vertical movement towards and away from the glass platen. Cam drive 44 comprising a cam 46, a cam follower 48 and a suitable electric stepper motor is provided for alternatingly moving the upper platen in a downward direction until rubber pad 42 firmly biases copy film 12 into an engagement with master fiche 10 and against the lower platen (as shown in FIG. 1) for retracting the upper platen with a suitable mechanism such as the schematically illustrated spring return 52 to raise the upper platen into the position shown in FIG. 2.

With the pressure platens 30, 32 in their raised or spaced apart position (FIG. 2) film drive 16 can be actuated to advance fresh copy film to the transfer station. The film drive comprises suitably arranged tension rolls 54 and a pair of cooperating drive rolls 56 between which copy film 12 passes and which are positioned just upstream of transfer station 8. One or both of the drive rolls are coupled to a stepper motor 58 which is actuated when the pressure platens 30, 32 are spaced apart to incrementally advance copy film by pushing it in a downstream direction towards the transfer station. By positioning the drive rolls upstream of the transfer station exposed sections of copy film can be severed from the remainder of the copy film supply immediately downstream of the transfer station, that is in substantial alignment with a downstream edge 60 of master fiche 10 so that copy film wastage is prevented.

To enable high speed operation of the duplicator, that is a high speed copy film transport to the transfer station even though the copy film is pushed rather than pulled, an air bearing is formed on both sides of the copy film to prevent sticking of the film to the master fiche or to the pressure pad 42 and/or to prevent the copy film from sliding on either one. The air bearing is formed by nozzles 62 positioned just upstream of the pressure platen and discharging therefrom pressurized air from a suitable source 64. A normally closed valve 66 is opened when the copy film is to be advanced and the upper pressure plate 30 is raised to direct air jets on both sides of the copy film. The pressurized air insures the release of both sides of the copy film from the master fiche and the rubber pad 42, respectively, so that upon actuation of drive rolls 56 the copy film floats on a cushion of air. Consequently, the drive rolls can operate at great speeds of as much as 20 to 50 centimeters per second and more, a speed heretofore unattainable except with pull-type film advancing mechanisms, to insure high speed copying. If no air jets were provided there is the danger that the copy film may stick while drive rolls 56 advance fresh film. This could result in film damage and a jamming of the machine, requiring costly repair and machine downtime.

Also disposed at the transfer station is a radiation source, that is a source of high intensity light such as a Xenon lamp 68 the construction and operation of which will be discussed in greater detail below. A funnel-shaped optical horn 70 is located beneath glass platen 32 to assure an even distribution of the light emitted by the lamp.

A rotary cutter 72 is positioned immediately downstream of pressure platens 30, 32 and comprises a pair of blades 74 that have a length slightly greater than the width of the copy film. The ends of the blades are suitably secured to radial arms 76 and they are connected to a shaft 78 that is incrementally driven by an electric motor (not shown) or the like. A cutting edge 80 of the blade cooperates with a cutting edge 82 on metal plate 40 of the upper pressure platen 30. After a length of copy film has been exposed at the transfer station and drive rolls 56 have advanced another like length of fresh copy film to the transfer station the rotary cutter is actuated to sever the exposed length of copy film 12a along a line in substantial alignment with downstream edge 60 of the master fiche. As can be seen from FIG. 2 the exposed copy film section travels between the two cutter blades 74 onto a first, downwardly inclined conveyor 84 for transfer of the section to the film developer 20.

The film duplicator of the present invention can employ a variety of film such as Vesicular or Diazo film available from the Xidex Corp., of Sunnyvale, California and other suppliers. Developer 20 is constructed to be compatible with the particular film used. Where Vesicular or Diazo film is used developer 20 is a heat developer in which heated platens 86 raise the temperature of the exposed copy film to the desired level for developing. Power driven belts 88 move the exposed film past the platen at the desired speed. From the developer the relatively warm, copy film section 12a is transferred onto cooling drum 22 which rotates in synchronism with a transport belt 90 wrapped about a portion of the drum and oriented so that the belt biases the section into intimate contact with the drum to effect the desired cooling. The drum 22 is constructed of a heat conductive material such as aluminum and cooled by passive air cooling. Alternatively, the film can be passed through an air cooled chamber (not shown) disposed downstream of the developing station before it is placed on belt 90 for transfer to curing station 24.

The developed copy film section leaves cooling drum 22 at the lower end of the drum and then lies on belt 90 and travels therewith towards discharge station 26. The curing station 24 is downstream of the cooling drum and positioned just above belt 90 so that developed copy film sections thereon pass underneath the curing station. The curing station comprises an enclosure 92 which houses a curing lamp, preferably another Xenon lamp 68. A suitable reflector 94 directs the light emitted by the Xenon lamp at the curing station onto the film passing underneath. This fixes the exposed and developed images on the copy film section so that it is ready for use. From the curing station belt 90 transports the copy film section to receptacle 28. It will be observed that each film is available for use as soon as it has been exposed, developed and cured without any waiting time for the exposure of other copies or of a full length of copy film stored on supply reel 14.

Referring now to FIGS. 1–4, Xenon lamp 68 comprises a conventional, elongate cylindrical lamp body 96 which mounts a pair of spaced apart electrodes 98 disposed within a gas atmosphere. Suitable connectors 100, 110 are provided to apply voltage to the electrodes. Such a Xenon lamp is commercially available from ILC Technology of 164 Commercial Street, Sunnyvale, California, and other. The commercially available lamps differ in that they include on the exterior of the lamp body a trigger wire (not shown in the drawings) which is spirally wound around the lamp and which is used for initiating a gas discharge.

Xenon lamp 68 employed by the present invention has the trigger wire removed. Instead, a light transmissive, preferably light transparent outer tube 102 is disposed about lamp body 96 and extends over the full length of the lamp. It includes a liquid intake conduit 104 and an outlet conduit 106 at its respective ends for connection to a liquid circulating system 108. The ends of the outer tubes are suitably sealed to ends of lamp body 96 to prevent leaks. In operation an electrically conductive liquid, which preferably also absorbs infrared radiation, is circulated through a space 110 between the lamp body 96 and the outer flow tube 102 so that the liquid is at all times in contact with the exterior surface of the lamp body. The presently preferred liquid is an aqueous solution of cupric sulfate ($CuSO_4$) with a cupric sulfate strength of no more than about 5 percent. This solution is substantially transparent to the ultraviolet light employed for contact printing at transfer station 8. The solution is electrically conductive and thus replaces the function of the heretofore necessary external trigger wire (which reduced the efficiency of the lamp) and further the solution absorbs infrared radiation. It thus acts both as a coolant for the lamp and as a filter preventing infrared radiation, which lowers the quality of the images printed on the copy film when Vesicular or Diazo film is used, from reaching the film. A cooler 112 is interposed in the flow circuit 108 to maintain the Xenon lamp at the desired temperature.

In operation the Xenon lamp of the present invention is pulsed, providing 30 light pulses per second. Each pulse is triggered by a trigger voltage of 10 to 15 kV from a trigger transformer 114 and is then driven by the discharge voltage from a 50 micro farad capacitor 116, which is charged via a diode 118 by a 1000 volt transformer 120. The trigger voltage is momentarily applied for no more than a few, e.g. two to three micro seconds.

A light impulse from the lamp is only obtained after the application of the high trigger voltage. An exposure control circuit 122 is provided which initiates each exposure of a film and continues the operation of the exposure lamp for the desired time. The circuit includes means for adjusting the exposure time so that the total exposure light intensity can be varied for adjusting the shade and darkness of the finished copy film.

The exposure control circuit generally comprises a photo cell 124 which is exposed to the Xenon lamp. The output from the photo cell is amplified and fed to a comparator 126 via an integrator. A reference signal from a manually operable rheostat 128 forms the second input to the comparator and the output of the comparator is supplied to a trigger control 130 for correspondingly increasing or decreasing the number of light pulses emitted by the lamp during each exposure cycle. In this manner the exposure of each copy film is readily controlled and adjusted. In this connection it is noteworthy that it is relatively easy to control the number of light pulses in the just-described manner. If the lamp were operated on a continuing basis a lengthening or shortening of the lamp operating cycle, and particularly, a precise control thereof is difficult to achieve.

In the preferred embodiment of the invention an identical Xenon lamp 68 is installed within optical cone 70 at transfer station 8 and at curing station 24. This operation is further combined so that a single power supply, i.e. transformer 120 can be employed. To this end the respective capacitors are alternatingly charged at the positive and negative cross-over point of the transformer and discharged or fired at the next corresponding cross-over points as is graphically illustrated in FIG. 4 to assure a maximum load on the transformer of no more than that required for charging one capacitor.

The operation of the duplicator should now be clear. A power supply switch (not shown in the drawings) is initially turned on to provide power to the various motors above described and the electric circuitry for Xenon lamps 68. The Xenon lamp at curing station 24 is continuously operated as long as the main power switch is closed while the Xenon lamp at the transfer station 8 is energized only in response to the initiation of a copying cycle.

The desired master-fiche is placed on upper surface 33 of glass platen 32 and the platen is moved along tracks 34 into registration with upper platen 30. Thereafter the operator depresses an initiation switch (not separately shown in the drawings) which first energizes motor 50 of cam drive 44 to firmly bias the copy film section at the transfer station against master-fiche 10. The copy cycle then continues by triggering Xenon lamp 68 within optical horn 70 as above described. The operator also sets rheostat 128 so that comparator 126 actuates trigger control 130 to yield the desired number of light pulses.

The copy cycle continues by energizing stepper motor 58 after the desired number of light pulses to advance exposed copy film section 12a and feed fresh copy film to the transfer station. As soon as the exposed copy film section has passed the transfer station rotary cutter 72 is energized to sever the exposed section from the remaining length of copy film. Copy film section 12a now continues to the developer, cooling drum and the curing station as above described.

The electric circuitry also includes means (not shown in the drawings) for repeating the copy cycle a plurality of times to obtain the desired number of copies from a given master. After that number of copies have been made the machine remains dormant until the initiation switch is again closed.

What is claimed is:

1. A microfiche duplicator comprising a transfer station including means for positioning a master-fiche at the station, means for storing a supply of copy film, means for advancing copy film into registration with the master-fiche, and exposing means for transferring an image from the master-fiche to a section of copy film registered with the master-fiche at the transfer station, the exposing means including a light source disposed on a side of the master-fiche opposite from the film section and comprising a gas discharge lamp having an inner tube enveloping spaced apart electrodes disposed in a gas atmosphere, an electrical power source for the lamp, a light transmissive tubular member surrounding the tube, and electrically conductive liquid means disposed in a space between the tube and the member acting as an external trigger device for the lamp for triggering the lamp with a relatively low trigger voltage.

2. Apparatus according to claim 1 wherein the lamp comprises a Xenon gas discharge lamp.

3. Apparatus according to claim 1 wherein the electrically conductive liquid means is adapted to absorb infrared radiation to limit the transfer of heat from the lamp to the film at the transfer station.

4. Apparatus according to claim 3 including means for cooling the electrically conductive liquid means.

5. Apparatus according to claim 4 wherein the cooling means comprises an intake and a spaced apart outlet on the member for the electrically conductive liquid means, a cooler for the liquid means, and means for circulating the liquid means through the space.

6. Apparatus according to claim 5 wherein the electrically conductive liquid means comprises a solution of water and cupric sulfate.

7. Apparatus according to claim 6 wherein the solution includes no more than about 5% cupric sulfate.

8. Apparatus for making duplicates of a microfiche master on copy film comprising:
a transfer station for aligning the master with a corresponding length of copy film so that an image on the master is transferred onto the copy film when radiation is directed through the master onto the copy film;
means for supplying the transfer station with fresh copy film and for withdrawing previously exposed copy film from the transfer station;
first and second gas discharge lamps each comprising an elongated lamp and a coaxially disposed light transmissive tube surrounding the lamp, and an electrically conductive liquid disposed in a space between the lamp and the tube;
electric circuit means for subjecting the lamps to voltage pulses to thereby generate corresponding light pulses;
means for mounting the first lamp at the transfer station for directing its light pulses to the master and thereby transfer the image from the master to the copy film;
means for transporting exposed copy film past a curing station to a discharge station for the exposed film; and
means for mounting the second lamp at the curing station to subject exposed copy film passing the curing station to pulsed radiation and to thereby fix the image thereon.

9. Apparatus according to claim 8 wherein the electric circuit means includes means for simultaneously activating the first and second lamps, means for alternatingly subjecting the first and second lamps to voltage pulses, and a single electrical power supply for the first and second lamps, whereby the alternating energization of the lamps subjects the power supply to a relatively constant load.

10. Apparatus according to claim 9 including means operatively coupled with the film supplying and withdrawing means and with the electric circuit means for energizing the first lamp only after fresh, unexposed copy film has been advanced to the transfer station.

11. Apparatus according to claim 10 including means for varying the number of voltage pulses to which the first lamp is subjected after the fresh copy film has been positioned at the transfer station to correspondingly control the number of light pulses generated by the lamp, and to thereby adjust the intensity of the transferred image.

* * * * *